(12) United States Patent
Lu et al.

(10) Patent No.: US 12,362,405 B2
(45) Date of Patent: Jul. 15, 2025

(54) MONITORING AND PROTECTION SYSTEM AND ENERGY STORAGE DEVICE

(71) Applicant: DELTA ELECTRONICS, INC., Taoyuan (TW)

(72) Inventors: Fei Lu, Shanghai (CN); Changyong Wang, Shanghai (CN); Wei Guan, Shanghai (CN); Jian Zhu, Shanghai (CN)

(73) Assignee: DELTA ELECTRONICS, INC., Taoyuan (TW)

( * ) Notice: Subject to any disclaimer, the term of this patent is extended or adjusted under 35 U.S.C. 154(b) by 647 days.

(21) Appl. No.: 17/657,132

(22) Filed: Mar. 30, 2022

(65) Prior Publication Data
US 2022/0328891 A1     Oct. 13, 2022

(30) Foreign Application Priority Data
Apr. 9, 2021    (CN) .................. 202110381796.X

(51) Int. Cl.
*H01M 10/48*      (2006.01)
*G01D 21/02*      (2006.01)
(Continued)

(52) U.S. Cl.
CPC .......... *H01M 10/486* (2013.01); *G01K 11/32* (2013.01); *G01L 1/242* (2013.01);
(Continued)

(58) Field of Classification Search
CPC ..... Y02E 60/10; H02H 7/18; H01M 2220/10; H01M 2010/4271; H01M 10/48;
(Continued)

(56) References Cited

U.S. PATENT DOCUMENTS

| | | | | |
|---|---|---|---|---|
| 5,995,686 A | * | 11/1999 | Hamburger | .............. G02B 6/02 385/12 |
| 7,155,075 B2 | * | 12/2006 | Rajendran | ........... H01M 10/486 374/E11.015 |

(Continued)

FOREIGN PATENT DOCUMENTS

| | | | |
|---|---|---|---|
| CN | 103529336 A | * | 1/2014 |
| CN | 105022902 A | * | 11/2015 |

(Continued)

OTHER PUBLICATIONS

Translation CN_106160084 (Year: 2016).*

(Continued)

*Primary Examiner* — Xin Y Zhong
*Assistant Examiner* — Monica S Young
(74) *Attorney, Agent, or Firm* — CKC & Partners Co., LLC

(57) ABSTRACT

The present application provides a monitoring and protection system and an energy storage device. The monitoring and protection system is applied to at least one battery module and includes a temperature monitoring apparatus, a deformation monitoring apparatus, and a control apparatus. The temperature monitoring apparatus includes a plurality of grating temperature sensors, and each grating temperature sensor is arranged on a corresponding battery module to obtain a current temperature of the battery module. The deformation monitoring apparatus obtains a current deformation amount of each battery module, and includes a plurality of grating strain sensors, and each grating strain sensor are arranged on a corresponding battery module. The control apparatus controls a protective unit to perform a corresponding protective action according to the current temperature and current deformation amount.

12 Claims, 9 Drawing Sheets

(51) Int. Cl.
  G01K 11/32 (2021.01)
  G01L 1/24 (2006.01)
  H01M 10/42 (2006.01)

(52) U.S. Cl.
  CPC ........ *H01M 10/4257* (2013.01); *G01D 21/02* (2013.01); *G01L 1/246* (2013.01); *H01M 2010/4271* (2013.01); *H01M 10/48* (2013.01); *H01M 2220/10* (2013.01); *Y02E 60/10* (2013.01)

(58) Field of Classification Search
  CPC ............ H01M 10/4257; H01M 10/486; G01L 1/246; G01L 1/242; G01K 11/32; G01K 11/3206; G01D 5/35316; G01D 21/02
  USPC ........................................................ 73/865.9
  See application file for complete search history.

(56) References Cited

U.S. PATENT DOCUMENTS

| | | | | |
|---|---|---|---|---|
| 2009/0196543 | A1* | 8/2009 | Lagakos | G02B 6/3514 385/12 |
| 2013/0312947 | A1* | 11/2013 | Bandhauer | H01M 10/6556 429/62 |
| 2014/0092375 | A1* | 4/2014 | Raghavan | G01L 1/246 356/32 |
| 2014/0203783 | A1* | 7/2014 | Kiesel | H01M 10/44 320/167 |
| 2015/0280290 | A1* | 10/2015 | Saha | H01M 10/4257 324/426 |
| 2017/0360279 | A1* | 12/2017 | Gafford | G01L 1/248 |

FOREIGN PATENT DOCUMENTS

| | | | | | |
|---|---|---|---|---|---|
| CN | 103529336 | B | | 4/2016 | |
| CN | 105576305 | A | | 5/2016 | |
| CN | 105904992 | A | | 8/2016 | |
| CN | 106597299 | A | | 4/2017 | |
| CN | 103713208 | B | | 6/2017 | |
| CN | 206441838 | U | | 8/2017 | |
| CN | 107340478 | A | | 11/2017 | |
| CN | 108491611 | A | | 9/2018 | |
| CN | 109637069 | A | | 4/2019 | |
| CN | 109683095 | A | | 4/2019 | |
| CN | 106160084 | B | * | 6/2019 | ........ H01M 10/4207 |
| CN | 110534825 | A | | 12/2019 | |
| CN | 110739495 | A | | 1/2020 | |
| CN | 110931908 | A | | 3/2020 | |
| CN | 111082166 | A | | 4/2020 | |
| CN | 113466701 | A | * | 10/2021 | ......... G01D 5/35316 |
| GB | 2584287 | A | * | 12/2020 | .......... H01M 10/613 |
| JP | 2008203214 | A | | 9/2008 | |

OTHER PUBLICATIONS

Translation CN_103529336 (Year: 2014).*
Corresponding Taiwan office action issued on May 2, 2023.
Chai Jing et al., "Research on Optical Fiber Sensing Monitoring Experiment of Stress-strain Distribution in Section Coal Pillar," Chinese Journal of Underground Space and Engineering, vol. 13, 7 pp. Feb. 15, 2017.
Corresponding China office action issued on Nov. 22, 2024 with its English translation. (23 pages).

* cited by examiner

MONITORING AND PROTECTION SYSTEM AND ENERGY STORAGE DEVICE

CROSS-REFERENCE TO RELATED APPLICATION

This application claims priority to Chinese Patent Application No. 202110381796.X filed on Apr. 9, 2021, which is hereby incorporated by reference in its entirety.

TECHNICAL FIELD

The present application relates to the technical field of battery modules, and in particular to a monitoring and protection system and an energy storage device.

BACKGROUND

With a rapid development of a new energy industry, a corresponding electricity driven device has become more and more widely used, which causes that a lot of attention is paid to a safety of a battery system. However, during an actual operation of high-power energy storage battery packs, often due to the harsh working environment, aging of the battery itself, and short circuit problem inside the battery, the battery system may be damaged, sprayed, or even overheated, exploded, or caught on fire.

With respect to the safety, a work of an existing battery management system (BMS) is mainly embodied in simple preventions such as preventing the battery from overcharging and overdischarging, and preventing a temperature of the battery from exceeding a working range, which makes it difficult to effectively suppress or prevent possible failures of the battery pack. In addition, no protective response is set, which may lead to a failure in preventing an accident from expanding in time after the accident occurred, thereby resulting in immeasurable loss and endangering life or property.

SUMMARY

The present application provides a monitoring and protection system and an energy storage device, which are configured to monitor of temperature and deformation of an energy storage element in real time and perform a corresponding protective action, thereby effectively suppressing and preventing an occurrence of a failure, and ensuring a safety of the energy storage element.

In the first aspect, a monitoring and protection system of the present application is applied to at least one battery module and includes:
- a temperature monitoring apparatus, including a plurality of grating temperature sensors, where each grating temperature sensor is arranged on a corresponding battery module, and configured to obtain a current temperature of the corresponding battery module;
- a deformation monitoring apparatus, configured to obtain a current deformation amount of each battery module, and including a plurality of grating strain sensors, where each grating strain sensor is arranged on a corresponding battery module; and
- a control apparatus, coupled to the temperature monitoring apparatus and the deformation monitoring apparatus, and configured to receive the current temperature and the current deformation amount of each battery module, and control a protective unit to perform a corresponding protective action according to the current temperature and the current deformation amount of each battery module.

In a possible design, the grating temperature sensor is arranged at any position of the corresponding battery module; and
the grating strain sensor is arranged on an outer surface of the corresponding battery module, and located at an axis of the outer surface.

In a possible design, the temperature monitoring apparatus further includes: a plurality of first optical fibers and first modems;
where each grating temperature sensor is coupled to a corresponding first optical fiber, and a first optical signal emitted from the grating temperature sensor is transmitted to the first modem through the corresponding first optical fiber; and
the first modem is configured to convert the first optical signal into the current temperature of the corresponding battery module, and transmit the current temperature of each battery module to the control apparatus.

In a possible design, the deformation monitoring apparatus further includes: a plurality of second optical fibers, a second modem, and a deformation calculation unit;
where each grating strain sensor is coupled to a corresponding second optical fiber, and a second optical signal emitted from the grating strain sensor is transmitted to the second modem through the corresponding second optical fiber;
the second modem is configured to convert the second optical signal into a current strain amount of the corresponding battery module, and transmit the current strain amount of each battery module to the deformation calculation unit; and
the deformation calculation unit is configured to determine the current deformation amount of each battery module according to the current strain amount of each battery module and a stored parameter, and transmit the current deformation amount of each battery module to the control apparatus.

In a possible design, the deformation calculation unit is configured to determine the current deformation amount of each battery module according to the following formula:

$$Z = \frac{y \tan\left(\arccos \frac{1}{1+\varepsilon}\right)}{2},$$

where Z is the current deformation amount of each battery module, y is the stored parameter, and ε is the current strain amount of each battery module.

In a possible design, the control apparatus includes a parameter processing unit and the protective unit:
where the parameter processing unit is configured to respectively compare the current temperature and/or the current deformation amount of each battery module with a preset value to determine a current state of each battery module; and
the protective unit is configured to perform a corresponding level of protection in response to the current state of each battery module.

In a possible design, the protective unit is capable of performing three levels of protective actions, where a first level of protective action corresponds to heating the battery module, a second level of protective action corresponds to giving an alarm and opening a switch, and a third level of protective action corresponds to activating a fire extinguishing apparatus.

In a possible design, if the control apparatus determines that the current temperature is less than or equal to a first preset temperature and the current deformation amount is less than a first preset deformation amount, the protective unit performs the first level of protective action.

In a possible design, if the control apparatus determines that the current temperature is greater than or equal to a second preset temperature but less than a third preset temperature, and the current deformation amount is less than a second preset deformation amount, the protective unit performs the second level of protective action.

In a possible design, if the control apparatus determines that the current deformation amount is greater than or equal to a first preset deformation amount but less than a second preset deformation amount, and the current temperature is less than a third preset temperature, the protective unit performs the second level of protective action.

In a possible design, if the control apparatus determines that the current temperature is greater than or equal to a third preset temperature, or the current deformation amount is greater than or equal to a second preset deformation amount, the protective unit performs the third level of protective action.

In a second aspect, the present application provides an energy storage device, including a monitoring and protection system, at least one energy storage element, a switch, and a load, where the switch is coupled between the at least one energy storage element and the load, the monitoring and protection system is coupled to the at least one energy storage element and the switch, and the monitoring and protection system includes:
- a temperature monitoring apparatus, including a plurality of grating temperature sensors, where each grating temperature sensor is arranged on a corresponding energy storage element, and configured to obtain a current temperature of the corresponding energy storage element;
- a deformation monitoring apparatus, configured to obtain a current deformation amount of each energy storage element, and including a plurality of grating strain sensors, where each grating strain sensor is arranged on a corresponding energy storage element; and
- a control apparatus, coupled to the temperature monitoring apparatus and the deformation monitoring apparatus, and configured to receive the current temperature and the current deformation amount of each energy storage element, and control a protective unit to perform a corresponding protective action according to the current temperature and the current deformation amount of each energy storage element.

In a possible design, the grating temperature sensor is arranged at any position of the corresponding energy storage element; and
the grating strain sensor is arranged on an outer surface of the corresponding energy storage element, and located at the axis of the outer surface.

In a possible design, the temperature monitoring apparatus further includes: a plurality of first optical fibers and a first modem;
where each grating temperature sensor is coupled to a corresponding first optical fiber, and a first optical signal emitted from the grating temperature sensor is transmitted to the first modem through the corresponding first optical fiber; and the first modem is configured to convert the first optical signal into the current temperature of the corresponding energy storage element, and transmit the current temperature of each energy storage element to the control apparatus.

In a possible design, the deformation monitoring apparatus further includes: a plurality of second optical fibers, a second modem, and a deformation calculation unit;
where each grating strain sensor is coupled to a corresponding second optical fiber, and a second optical signal emitted from the grating strain sensor is transmitted to the second modem through the corresponding second optical fiber;
the second modem is configured to convert the second optical signal into a current strain amount of the corresponding energy storage element, and transmit the current strain amount of each energy storage element to the deformation calculation unit; and
the deformation calculation unit is configured to determine the current deformation amount of each energy storage element according to the current strain amount of each energy storage element and a stored parameter, and transmit the current deformation amount of each energy storage element to the control apparatus.

In a possible design, the deformation calculation unit is configured to determine the current deformation amount of each energy storage element according to the following formula:

$$Z = \frac{y\tan\left(\arccos\frac{1}{1+\varepsilon}\right)}{2},$$

where Z is the current deformation amount of each energy storage element, y is the stored parameter, and $\varepsilon$ is the current strain amount of each energy storage element.

In a possible design, the control apparatus includes a parameter processing unit and the protective unit:
where the parameter processing unit is configured to respectively compare the current temperature and/or the current deformation amount of each energy storage element with a preset value to determine a current state of each energy storage element; and
the protective unit is configured to perform a corresponding level of protection in response to the current state of each energy storage element.

In a possible design, the protective unit is capable of performing three levels of protective actions, where a first level of protective action corresponds to heating the energy storage element, a second level of protective action corresponds to giving an alarm and opening a switch, and a third level of protective action corresponds to activating a fire extinguishing apparatus.

In a possible design, if the control apparatus determines that the current temperature is less than or equal to a first preset temperature and the current deformation amount is less than a first preset deformation amount, the protective unit performs the first level of protective action.

In a possible design, if the control apparatus determines that the current temperature is greater than or equal to a second preset temperature but less than a third preset temperature, and the current deformation amount is less than a second preset deformation amount, the protective unit performs the second level of protective action.

In a possible design, if the control apparatus determines that the current deformation amount is greater than or equal to a first preset deformation amount but less than a second preset deformation amount, and the current temperature is less than a third preset temperature, the protective unit performs the second level of protective action.

In a possible design, if the control apparatus determines that the current temperature is greater than or equal to a third preset temperature, or the current deformation amount is greater than or equal to a second preset deformation amount, the protective unit performs the third level of protective action.

BRIEF DESCRIPTION OF DRAWINGS

In order to further clarify technical solutions in embodiments of the present application or the prior art, the drawings need to be used in the description of the embodiments or the prior art will be briefly introduced below. Obviously, the drawings in the following description are some embodiments of the present application. For those of ordinary skill in the art, other drawings can be obtained based on these drawings without creative step.

DESCRIPTION OF EMBODIMENTS

Figure 1:
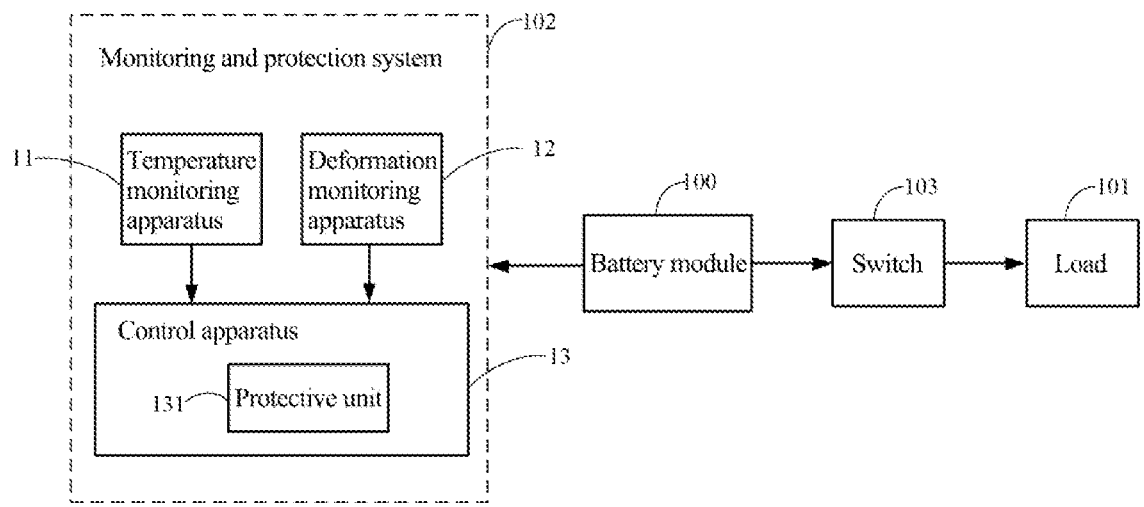
FIG. 1 is a schematic diagram of an application scenario according to an embodiment of the present application.

The exemplary embodiments will be described in detail here, and examples thereof are shown in the accompanying drawings. When the following description refers to the drawings, unless otherwise indicated, the same numbers in different drawings indicate the same or similar elements. The implementation described in the following exemplary embodiments does not represent all implementation consistent with the present application. On the contrary, they are merely examples of methods or apparatuses consistent with some aspects of the application as detailed in the appended claims.

The terms "first", "second", "third", "fourth", etc. (if any) in the description, claims, and the above-mentioned drawings are used to distinguish similar objects, and are not necessarily used to describe a specific order or sequence. It should be understood that the data used in this way can be interchanged under appropriate circumstances, so that the embodiments of the present application described herein can be implemented in a sequence other than those illustrated or described herein. In addition, the terms "including" and "having" and any variations thereof are intended to cover non-exclusive inclusions. For example, a process, method, system, product, or device that includes a series of steps or units is not necessarily limited to those clearly listed. Instead, other steps or units that are not clearly listed or are inherent to these processes, methods, products, or device may also be included.

In view of the problems in the prior art, embodiments of the present application provide a monitoring and protection system and an energy storage device. In the monitoring and protection system of the embodiment, a temperature monitoring apparatus and a deformation monitoring apparatus are provided to detect parameters of an energy storage element. For example, the energy storage element can be a battery module. The temperature monitoring apparatus includes a plurality of grating temperature sensors, and each grating temperature sensor can obtain a current temperature of the energy storage element such as a corresponding battery module. The deformation monitoring apparatus includes a plurality of gratings strain sensors, and each grating strain sensor can obtain a current deformation amount of the energy storage element such as a corresponding battery module. In addition, a control apparatus is coupled to the temperature monitoring apparatus and the deformation monitoring apparatus. The control apparatus can receive the current temperature and the current deformation amount of the energy storage element such as each battery module, and control a protective unit to perform a corresponding protective action according to the current temperature and the current deformation amount of the energy storage element such as each battery module, so as to realize a real-time monitoring of the current temperature and the current deformation amount of the energy storage element such as the battery module and realize a protective response according to a monitoring situation, thereby effectively suppressing an occurrence of a failure, and ensuring an safety of the energy storage element such as the battery module as well as the energy storage device.

An exemplary application scenario of the embodiments of the present application will be introduced hereinafter.

FIG. 1 is a schematic diagram of an application scenario according to an embodiment of the present application. As shown in FIG. 1, at least one battery module 100 is coupled to a load 101 through a switch 103, and can supply energy to the load 101 to enable the load 101 to operate normally. During the period that the battery module 100 supplies energy to the load 101, temperature and deformation of the battery module 100 may be changed due to various reasons, which may thus cause a battery failure. In order to effectively suppress and prevent an occurrence of a battery failure, an embodiment of the present application provides a monitoring and protection system 102, which is applied to the battery module 100 to monitor a current temperature and a current deformation amount of the battery module 100 in real time and activate a protective response according to a monitoring situation. The monitoring and protection system 102 includes a temperature monitoring apparatus 11, a deformation monitoring apparatus 12, and a control apparatus 13. The temperature monitoring apparatus 11 is configured to obtain the current temperature of the battery module 100, the deformation monitoring apparatus 12 is configured to obtain the current deformation amount of the battery module 100, and the control apparatus 13 can receive the current temperature and the current deformation amount, and control a protective unit 131 to perform a corresponding protective action according to the received current temperature and current deformation amount. The monitoring and protection system 102 can achieve a powerful monitoring of the current temperature and the current deformation amount of the battery module 100, and activate a protective response according to the monitoring situation, thereby effectively suppressing and preventing the possible battery failure of the battery module 100, and enhancing the safety of the battery module 100.

It is understandable that the control apparatus 13 can be configured as a digital processor such as MCU (Microcontroller Unit), DSP (Digital Signal Processing) and so on. The control apparatus 13 can control the protective unit 131 to perform a corresponding protective action according to a received signal through executing corresponding instructions or computer programs.

It should be noted that the embodiment of the present application does not limit the type of the load 101. For example, the load 101 may be an electric vehicle. In addition, the embodiment of the present application does not limit the number or specific layout of battery cells in the battery module 100.

In addition, an embodiment of the present application also provides an energy storage device which includes the monitoring and protection system 102 and at least one energy storage element. The possible failures of the energy storage element are effectively suppressed and prevented by the monitoring and protection system 102, thereby ensuring the safety of the energy storage element. The energy storage element may be an element with corresponding energy storage functions, such as battery modules or other elements. The specific structure of the energy storage element is not limited in the embodiment.

It should be understood that the above application scenarios are only illustrative, the monitoring and protection system and the energy storage device provided in the embodiments of the present application include but are not limited to the above application scenarios.

Figure 2:
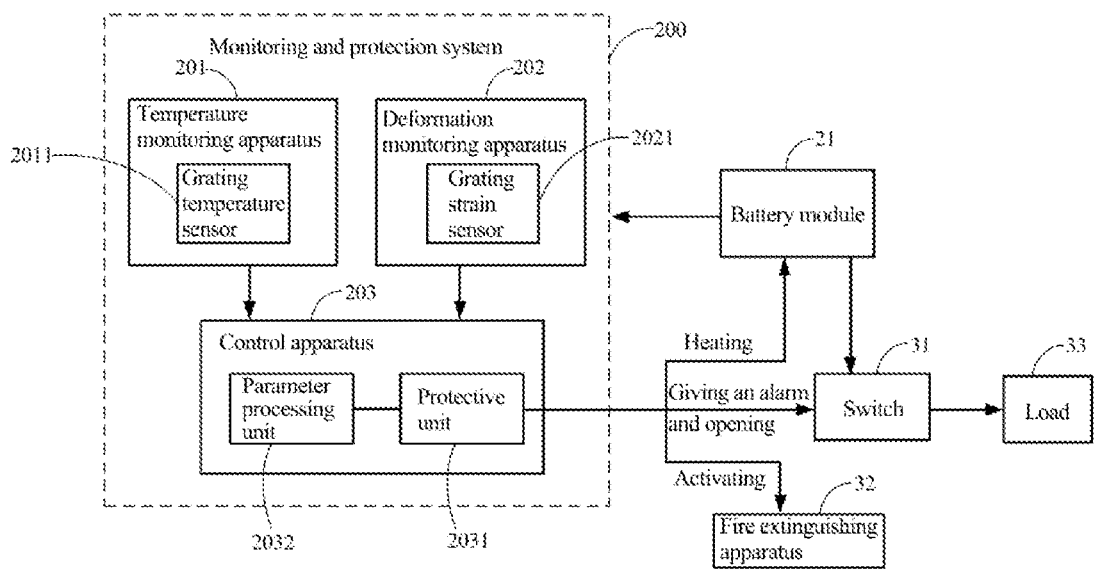
FIG. 2 is a schematic structural diagram of a monitoring and protection system according to an embodiment of the present application.

FIG. 2 is a schematic structural diagram of a monitoring and protection system according to an embodiment of the present application. As shown in FIG. 2, the monitoring and protection system 200 according to the embodiment of the present application is applied to at least one battery module 21. The monitoring and protection system 200 includes a temperature monitoring apparatus 201, a deformation monitoring apparatus 202, and a control apparatus 203. The temperature monitoring apparatus 201 includes a plurality of grating temperature sensors 2011. Each grating temperature sensor is arranged on a corresponding battery module, and configured to obtain a current temperature of the corresponding battery module. The deformation monitoring apparatus 202 includes a plurality of grating strain sensors 2021. Each grating strain sensor is arranged on a corresponding battery module, and configured to obtain a current deformation amount of the corresponding battery module. The control apparatus 203 is coupled to the temperature monitoring apparatus 201 and the deformation monitoring apparatus 202, and configured to receive the current temperature and current deformation amount of each battery module and control a protective unit 2031 to perform a corresponding protective action according to the received signal.

The embodiment does not limit the number of the grating temperature sensors 2011 included in the temperature monitoring apparatus 201 and the number of the grating strain sensors 2021 included in the deformation monitoring apparatus 202. Each grating temperature sensor and each grating strain sensor may be respectively arranged on the corresponding battery module 21. For example, at least one grating temperature sensor and at least one grating strain sensor are arranged on a battery module to obtain the current temperature and current deformation amount of the corresponding battery module respectively. When a battery module is provided with a plurality of grating temperature sensors and a plurality of grating strain sensors, an average value of a plurality of detected temperature and an average value of a plurality of detected deformation amount can be taken to obtain the current temperature and the current deformation amount of the corresponding battery module, respectively.

The grating temperature sensors and the grating strain sensors can be any type of optical fiber sensor, such as a FBG (Fiber Bragg Grating) sensor, which is not limited in the embodiment. Since the optical fiber sensor is not affected by harsh factors such as vibration, high pressure, high temperature, electromagnetic interference, it is used in the monitoring and protection system of the present application to monitor the temperature and deformation of the battery module.

Figure 3:
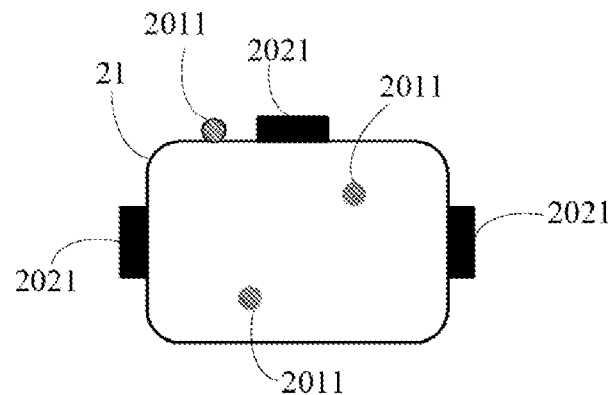
FIG. 3 is a schematic diagram of an arrangement position of a grating temperature sensor and a grating strain sensor according to an embodiment of the present application.

In some embodiments, an arrangement position of each grating temperature sensor and each grating strain sensor on the battery module can be seen from FIG. 3, which is a schematic diagram of positions of the grating temperature sensor and the grating strain sensor according to an embodiment of the present application. As shown in FIG. 3, the grating temperature sensor 2011 can be arranged at any position of the corresponding battery module 21. For example, the grating temperature sensor 2011 can be fixed to any position on a surface of the battery module 21 or located inside the battery module 21 by pasting. The grating strain sensor 2021 may be arranged on an outer surface of the corresponding battery module 21 and located at an axis of the outer surface, so as to accurately obtain the current deformation amount of the battery module 21. For example, the grating strain sensor 2021 can be fixed to a flat section of the axis of the outer surface of the battery module 21 by pasting. FIG. 3 schematically illustrates the battery module 21 and several grating temperature sensor 2011 and several grating strain sensor 2021 provided thereon, which should not be regarded as a limitation to their arrangement position on the battery module 21 or their specific number. It is understandable that in actual working conditions, the specific number and position of the grating temperature sensors 2011 and the grating strain sensors 2021 arranged on the battery module 21 can be set according to the actual surface area of the battery module 21.

Figure 4:
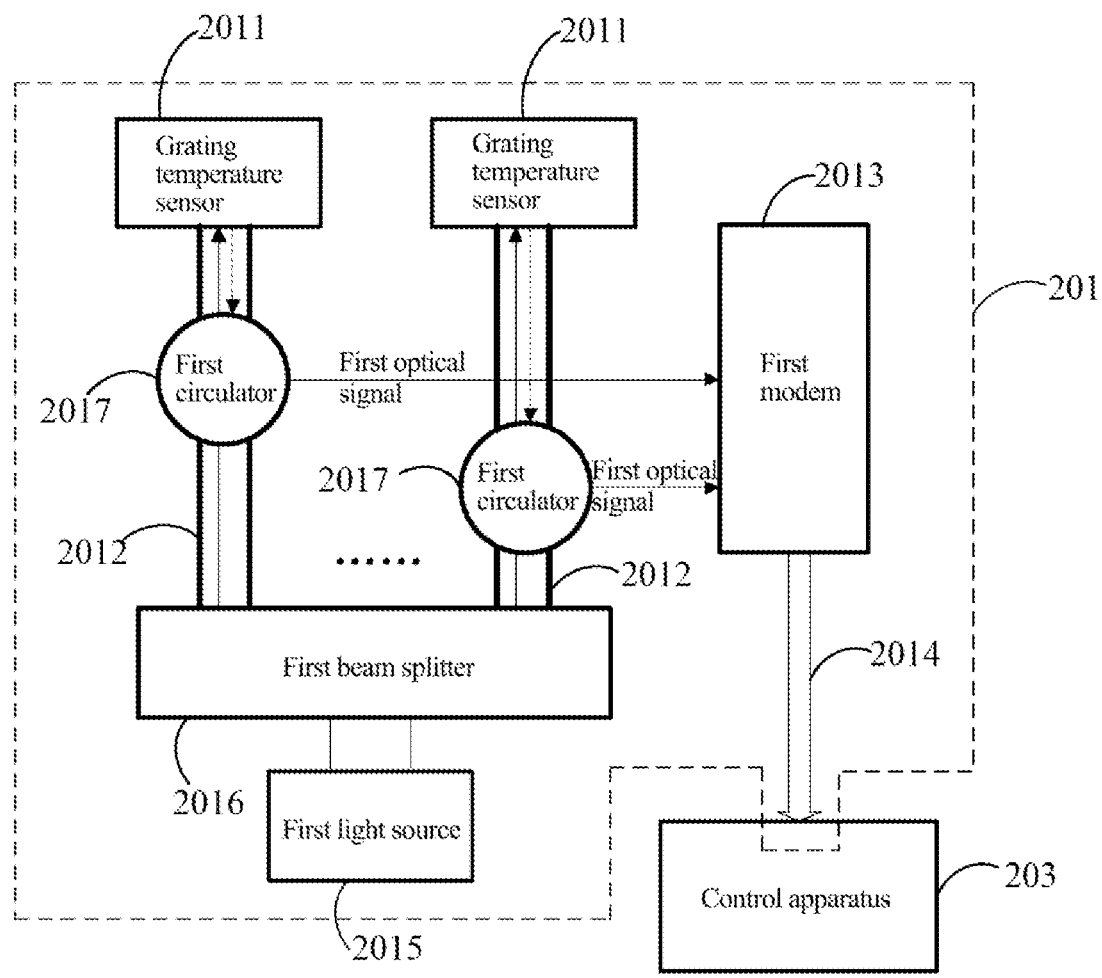
FIG. 4 is a schematic structural diagram of a temperature monitoring apparatus according to an embodiment of the present application.

FIG. 4 shows a structural diagram of a temperature monitoring apparatus according to an embodiment of the present application. As shown in FIG. 4, the temperature monitoring apparatus 201 includes a plurality of grating temperature sensors 2011, a plurality of first optical fibers 2012, and a first modem 2013.

Each grating temperature sensor 2011 is coupled to a corresponding first optical fiber 2012, and a first optical signal emitted from the grating temperature sensor 2011 is transmitted to the first modem 2013 through the corresponding first optical fiber 2012.

Further, the first modem 2013 converts the first optical signal into a current temperature of the corresponding battery module 21, and the current temperature of each battery module is transmitted to the control apparatus 203 through a first communication bus 2014.

In order to further clarify the structure of the temperature monitoring apparatus 201 in the accompanying drawing, it is shown schematically that one optical fiber corresponds to one grating temperature sensor and one optical fiber corresponds to one battery module in FIG. 4. In practical applications, one optical fiber can be coupled to a plurality of grating temperature sensors and one battery module can be coupled to a plurality of optical fibers.

In FIG. 4, a first light source 2015 and a first beam splitter 2016 are provided in the temperature monitoring apparatus 201. The first beam splitter 2016 is coupled to the plurality of first optical fibers 2012, and the grating temperature sensor 2011 is coupled to a corresponding first optical fiber 2012. The light source 2015 can be set as a corresponding wide-spectrum light source. An incident light generated by the first light source 2015 can be split into a plurality groups of light beams after passing through the first beam splitter 2016, such as n groups. The value of n is the total number of the first optical fiber 2012. After being split, the incident light (as indicated with the solid arrow in FIG. 4) is transmitted through the corresponding first optical fiber 2012 to the grating temperature sensor 2011 which is coupled to the corresponding first optical fiber 2012, and each incident light beam passes through the grating temperature sensor 2011 and becomes a corresponding reflected light. The reflected light (as indicated with the dashed arrow in FIG. 4) is transmitted to the first modem 2013 through a first circulator 2017 provided on the same branch as the incident light, so that the first optical fiber 2012 transmits the first optical signal emitted from the corresponding grating temperature sensor 2011 to the first modem 2013. The incident light passes through a grating in the grating temperature sensor 2011 and becomes the corresponding reflected light, and a wavelength value of the reflected light is the first optical signal.

It can be understood that, each first circulator 2017 is arranged on each first optical fiber 2012 to transmit the reflected light in the first optical fiber 2012 to the first modem 2013, and the number of the first circulator 2017 is n.

The first modem 2013 converts the received first optical signal into a temperature value, and the temperature value obtained through the conversion is the current temperature of the battery module 21 on which the grating temperature sensor 2011 is arranged. Furthermore, the obtained current temperature of the battery module 21 can be transmitted to the control apparatus 203 through the first communication bus 2014, such as RS485. When there are a plurality of battery modules 21, the current temperature of each battery module can be obtained through the above process, and the current temperature of each battery module is transmitted to the control apparatus 203 respectively. For example, n optical fibers and n grating temperature sensors detect temperature information of n battery modules respectively, and the current temperatures $T_{i1}, T_{i2} \ldots T_{in}$ of n battery modules are obtained through the first modem 2013.

Figure 5:
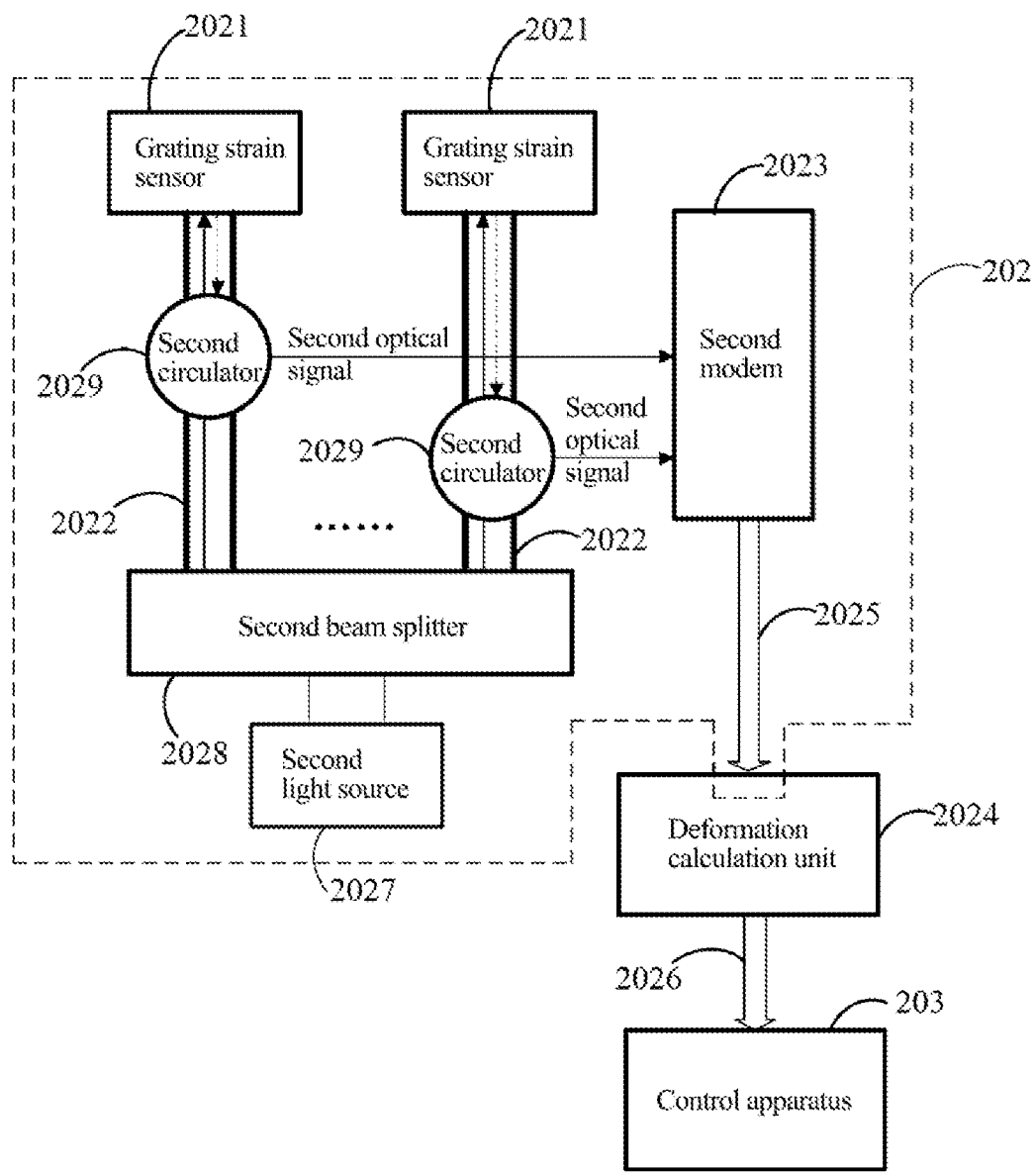
FIG. 5 is a schematic structural diagram of a deformation monitoring apparatus according to an embodiment of the present application.

FIG. 5 shows a structural diagram of a deformation monitoring apparatus according to an embodiment of the present application. As shown in FIG. 5, the deformation monitoring apparatus 202 provided in the embodiment includes a plurality of grating strain sensors 2021, a plurality of second optical fibers 2022, a second modem 2023, and a deformation calculation unit 2024.

Each grating strain sensor 2021 is arranged on a corresponding battery module 201, and coupled to a corresponding second optical fiber 2022. A second optical signal emitted from the grating strain sensor 2021 is transmitted to the second modem 2023 through the corresponding second optical fiber 2022.

Further, the second modem 2023 converts the second optical signal into the current strain amount of the corresponding battery module 21, and the current strain amount of each battery module is transmitted to the deformation calculation unit 2024 through a second communication bus 2025.

The deformation calculation unit 2024 determines the current deformation amount of each battery module according to the current strain amount of each battery module and stored parameters, and the current deformation amount of each battery module is transmitted to the control apparatus 203 through a third communication bus 2026.

In order to further clarify the structure of the deformation monitoring apparatus 202 in the accompanying drawing, it is schematically shown in FIG. 5 that one optical fiber corresponds to one grating strain sensor and one optical fiber corresponds to one battery module. In practical applications, one optical fiber can be coupled to a plurality of grating strain sensors, and one battery module can be coupled to a plurality of optical fibers.

Referring to FIG. 5, a second light source 2027 and a second beam splitter 2028 are provided in the deformation monitoring apparatus 202. The second beam splitter 2028 is coupled to the plurality of second optical fibers 2022. The grating strain sensor 2021 is coupled to a corresponding second optical fiber 2022. The second light source 2027 can be set as a wide-spectrum light source. An incident light generated by the second light source 2027 can be split into a plurality groups of light beams after passing through the second beam splitter 2028, such as n'groups, and the value of n' is the total number of the second optical fiber 2022. After being split, the incident light (as indicated with the solid arrows in FIG. 5) is transmitted through the corresponding second optical fiber 2022 to the grating strain sensor 2021 which is coupled to the corresponding second optical fiber 2022. And each incident light beam passes through the grating strain sensor 2021 and becomes a corresponding reflected light. The reflected light (as indicated with the dashed arrow in FIG. 5) is transmitted to the second modem 2023 through a second circulator 2029 provided on the same path as the incident light, so that the second optical fiber 2022 transmits the second optical signal emitted from the corresponding grating strain sensor 2021 to the second modem 2023. The incident light passes through a grating in the grating strain sensor 2021 and becomes the corresponding reflected light, and a wavelength value of the reflected light is the second optical signal.

It is understandable that each second circulator 2029 is arranged on each second optical fiber 2022 to transmit the reflected light in the second optical fiber 2022 to the second modem 2023, and the number of the second circulator 2029 is n', wherein n' could be equal to n.

The second modem 2023 converts the received second optical signal into a strain amount, and the strain amount obtained through the conversion is the current strain amount of the battery module 21 on which the grating strain sensor 2021 is arranged. Furthermore, the obtained current strain amount of the battery module 21 can be transmitted to the deformation calculation unit 2024 through the second communication bus 2025, such as RS485, and then the deformation calculation unit 2024 determines the current deformation amount of the battery module 21 according to the received current strain amount of each battery module 21 and stored parameters. The current deformation amount of each battery module is transmitted to the control apparatus 203 through the third communication bus 2026. The third communication bus 2026 may be RS485. When there are a plurality of battery modules 21, the current deformation amount of each battery module can be obtained through the above process, and the current deformation amount of each battery module is transmitted to the control apparatus 203 respectively. For example, n optical fibers and n grating strain sensors detect strain information of n battery modules respectively, and the current deformation amounts $Z_{i1}$, $Z_{i2}$ ... $Z_{in}$ of n battery modules are obtained through the second modem 2023 and the deformation calculation unit 2024.

In the actual working conditions, the first light source 2015, the first beam splitter 2016, the first circulator 2017, the first optical fiber 2012 and the first modem 2013 in the temperature monitoring apparatus 201 as well as the second light source 2027, the second beam splitter 2028, the second circulator 2029, the second optical fiber 2022 and the second modem 2023 in the deformation monitoring apparatus 202 could be commonly used parts, or may be provided separately and independently, which is not limited in this embodiment.

In one embodiment, the deformation calculation unit 2024 determines the current deformation amount of each battery module 21 according to the following formula (1):

$$Z = \frac{y\tan\left(\arccos\frac{1}{1+\varepsilon}\right)}{2} \quad (1)$$

wherein Z represents the current deformation amount of each battery module 21, y is the stored parameter, and ε is the current strain amount of each battery module 21.

Figure 6:
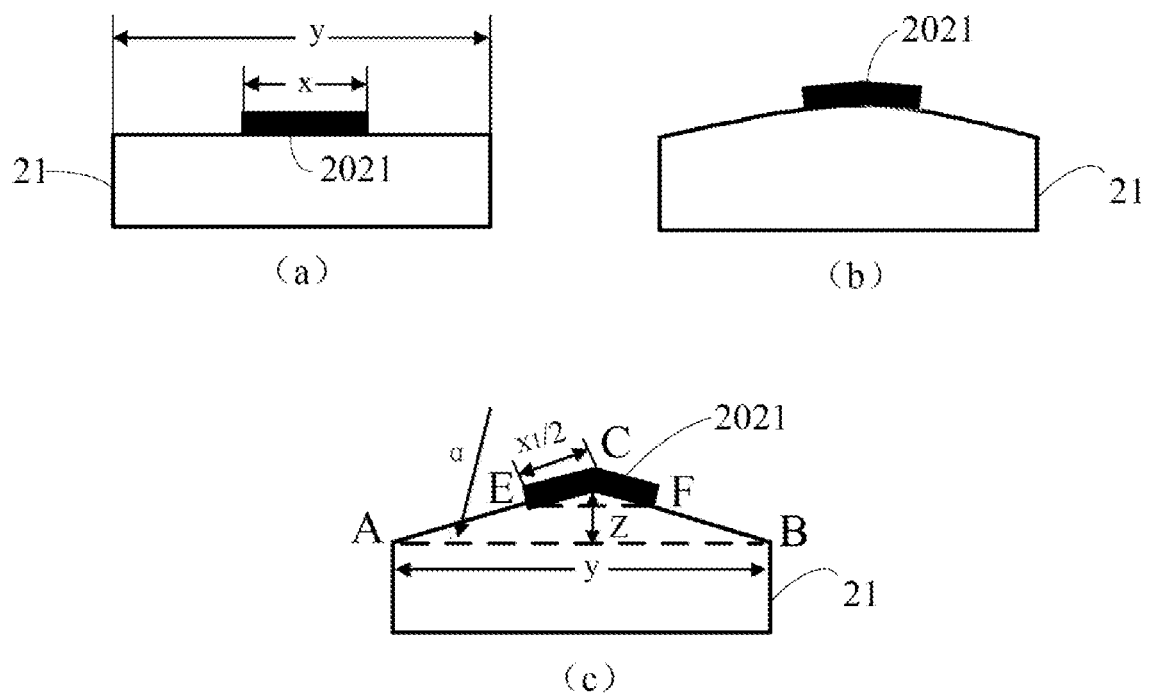
FIG. 6 is a schematic diagram of a deformation of a battery module according to an embodiment.

Referring to FIGS. 3 and 6, FIG. 6 is a schematic diagram of a deformation of a battery module according to an embodiment. The grating strain sensor 2021 is arranged on an axis of an outer surface of the battery module 21. FIG. 6(a) represents a positional relationship between the grating strain sensor 2021 and the battery module 21 when no deformation of the battery module 21 occurs. The stored parameter y represents a width of a plane of the battery module 21 on which the grating strain sensor 2021 is arranged, and x represents an initial dimension of the grating strain sensor 2021. The specific value of the initial dimension is determined by the specification of the arranged grating strain sensor 2021. When the battery module 21 is deformed due to a reason such as pressure expansion during the operation of the battery module 21, the deformed battery module 21 and the grating strain sensor 2021 are shown in FIG. 6(b). An equivalent schematic diagram of the deformation as shown in FIG. 6(c) is acquired through an equivalent conversion on the deformed surface of the battery module 21 shown in FIG. 6(b). That is, the deformed planes of the battery module 21 and the grating strain sensor 2021 are approximately equivalent to an isosceles triangle ACB and an isosceles triangle ECF shown in FIG. 6(c). As shown in FIG. 6(c), a represents a protrusion angle of the battery module 21 and Z represents a current deformation amount of the battery module 21. The relationship among the current deformation amount Z, the protrusion angle α and the width y of the plane of the battery module 21 on which the grating strain sensor 2021 is arranged is expressed as the following formula (2):

$$Z = \frac{y\tan\alpha}{2} \quad (2)$$

Further, according to a relationship between a measurement value ε of the grating strain sensor 2021, and the protrusion angle α, the protrusion angle α of the battery model 21 can be calculated based on the current strain amount of the battery module 21 obtained by the grating strain sensor 2021. The current deformation amount Z of the battery module can be calculated with the formula (2).

The length of the deformed grating strain sensor 2021 is assumed to be $x_1$, and the deformed length $x_1$ and the current strain amount ε satisfy a corresponding relationship expressed by the following formula (3):

$$x_1 = (1+\varepsilon)*x \quad (3)$$

wherein the current strain amount ε is a relative value, for example, it can be expressed as a percentage number.

Further, as shown in FIG. 6(c), the deformed grating strain sensor 2021 can be approximately equivalent to the isosceles triangle ECF, and the deformed battery module 21 can be approximately equivalent to the isosceles triangle ACB. Since EF is parallel to AB, ∠CEF and ∠CAB are equal, which are a. Therefore, for φCEF, a relationship expressed by the following formula (4) is satisfied:

$$\cos\alpha = \frac{0.5*x}{0.5*x_1} \quad (4)$$

Formula (3) is substituted into formula (4), and formula (5) can be obtained:

$$\cos\alpha = \frac{1}{1+\varepsilon} \quad (5)$$

According to formula (5), a relationship between the current strain amount ε and the protrusion angle α can be obtained as shown in formula (6):

$$\alpha = \arccos\frac{1}{1+\varepsilon} \quad (6)$$

Through the description of the above embodiment, and further substituting formula (6) into formula (2), a relationship expression between the current strain amount c, the stored parameter y and the current deformation amount Z can be obtained, which is shown as the formula (1).

The deformation calculation unit 2024 can determine the current deformation amount of each battery module according to formula (1) and the current strain amount obtained by the grating strain sensor 2021. The obtained current deformation amount of each battery module can be transmitted to the control apparatus 203 through the third communication bus 2026, so that the control apparatus 203 controls the protective unit 2031 to perform a corresponding protective action according to the received signal.

Referring to FIG. 2, the control apparatus 203 includes a parameter processing unit 2032 and a protective unit 2031.

The parameter processing unit 2032 is configured to respectively compare the current temperature and the current deformation amount of each battery module 21 with a preset value and determine a current state of each battery module 21. The protective unit 2031 performs a corresponding level of protection in response to the current state of each battery module 21.

For example, the protective unit 2031 can perform three levels of protective actions in response to the current state of each battery module 21. The first level of protective action corresponds to heating the battery module 21, the second level of protective action corresponds to giving an alarm and opening the switch 31 which is used to control opening and closing of the electrical connection between the battery module 21 and a corresponding load 33, and the third level of protective action corresponds to activating a fire extinguishing apparatus 32. The heating apparatus for heating the battery module is located inside a battery cabinet. By controlling the operation of the heating apparatus, the temperature of the battery module 21 is maintained at a set value to ensure a normally operation of the battery module 21. The heating apparatus may adopt device such as a flat electric heating pad or a water temperature heating plate. The fire extinguishing apparatus 32 is located inside or outside the battery cabinet. The fire extinguishing apparatus 32 is connected with a fire pipe, which is arranged inside the battery cabinet. When the fire extinguishing apparatus 32 is activated, a fire extinguishing material is released into the battery cabinet through the fire pipe. It can be understood that the protective actions performed by the protective unit 2031 include but are not limited to the three levels of protective actions listed above, other settings can also be made according to actual working conditions.

The monitoring and protection system provided by the embodiment of the present application is applied to at least one battery module. The monitoring and protection system includes the temperature monitoring apparatus, the deformation monitoring apparatus, and the control apparatus. The temperature and deformation amount of the battery module are monitored in real time by the provided temperature monitoring apparatus and deformation monitoring apparatus, and the protective unit is controlled by the control apparatus to perform the protective action according to the monitoring situation, thereby effectively suppressing and preventing an occurrence of a failure of the battery module, and enhancing the safety of the battery module.

Figure 7A:
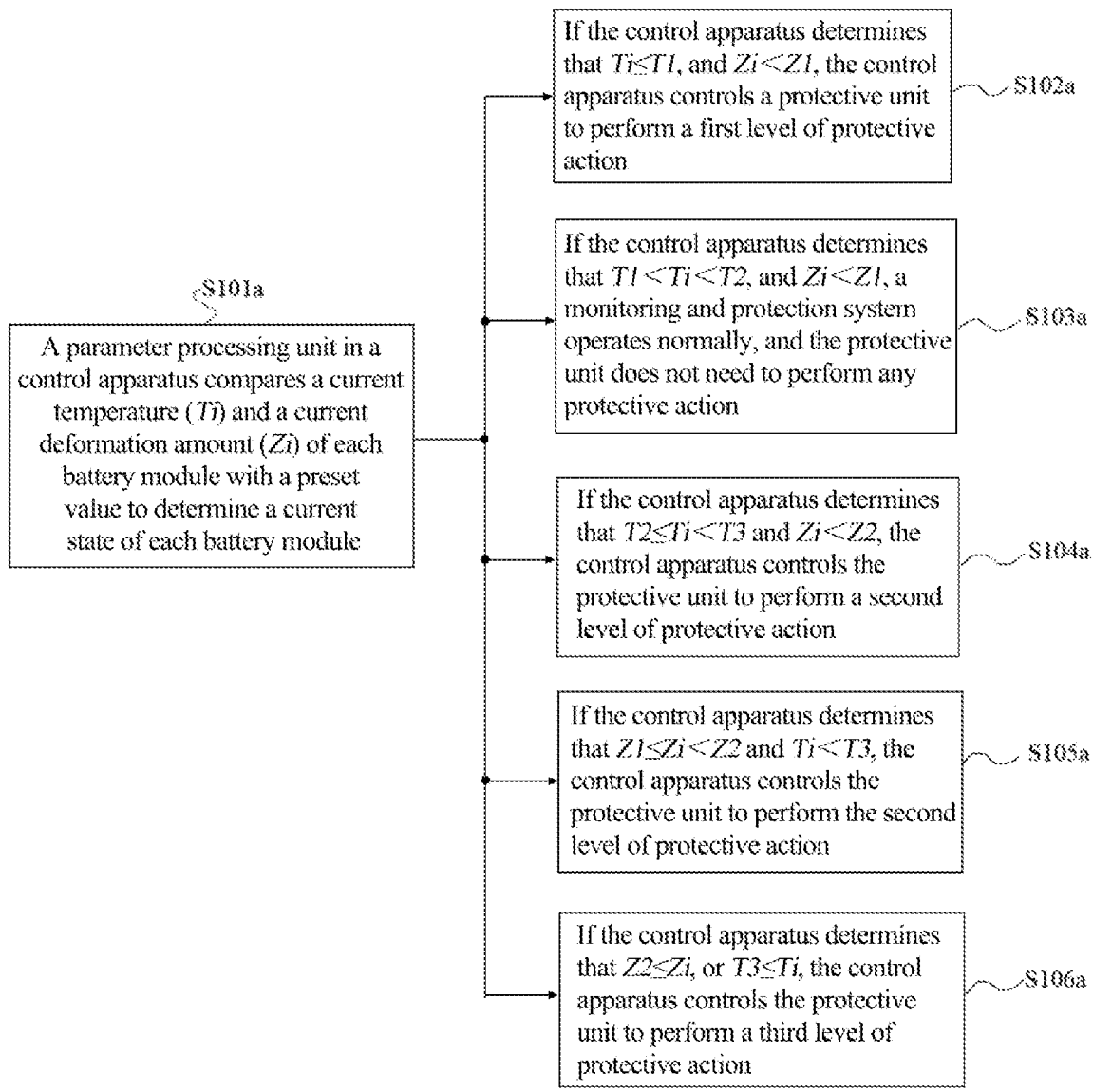
FIG. 7a is a schematic diagram of a control method of a control apparatus according to an embodiment of the present application.

FIG. 7a is a schematic diagram of a control method of a control apparatus provided by an embodiment of the present application. As shown in FIG. 7a, the control method provided in the embodiment includes the following steps.

S101a, a parameter processing unit in the control apparatus respectively compares a current temperature ($T_i$) and a current deformation amount ($Z_i$) of each battery module with a preset value to determine a current state of each battery module. The preset value includes a first preset temperature ($T_1$), a second preset temperature ($T_2$), a third preset temperature ($T_3$), a first preset deformation amount ($Z_1$), and a second preset deformation amount ($Z_2$).

The determined current state of each battery module can be understood as a relationship between the current temperature and/or the current deformation amount with the preset value.

S102a, if the control apparatus determines that the current temperature ($T_i$) is less than or equal to the first preset temperature ($T_1$), and the current deformation amount ($Z_i$) is less than the first preset deformation amount ($Z_1$), the control apparatus controls the protective unit to perform the first level of protective action, which is heating the corresponding battery module.

S103a, if the control apparatus determines that the current temperature ($T_i$) is greater than the first preset temperature ($T_1$) but less than the second preset temperature ($T_2$), and the current deformation amount ($Z_i$) is less than the first preset deformation amount, the monitoring and protection system operates normally, and the protective unit does not need to perform any protective action.

S104a, if the control apparatus determines that the current temperature ($T_i$) is greater than or equal to the second preset temperature ($T_2$) but less than the third preset temperature ($T_3$), and the current deformation amount ($Z_i$) is less than the second preset deformation amount ($Z_2$), the control apparatus controls the protective unit to perform the second level of protective action, which is giving an alarm and opening a switch.

S105a, if the control apparatus determines that the current deformation amount ($Z_i$) is greater than or equal to the first preset deformation amount ($Z_1$) but less than the second preset deformation amount ($Z_2$), and the current temperature ($T_i$) is less than the third preset temperature ($T_3$), the control apparatus controls the protective unit to perform the second level of protective action, which is giving an alarm and opening the switch.

S106a, if the control apparatus determines that the current deformation amount ($Z_i$) is greater than or equal to the second preset deformation amount ($Z_2$), or the current temperature ($T_i$) is greater than or equal to the third preset temperature ($T_3$), the control apparatus controls the protective unit to perform the third level of protective action, which is activating a fire extinguishing apparatus.

Respective values of the first preset temperature ($T_1$), the second preset temperature ($T_2$), and the third preset temperature ($T_3$) should satisfy $T_1 < T_2 < T_3$, values of the first preset deformation amount ($Z_1$) and the second preset deformation amount ($Z_2$) should satisfy $Z_1 < Z_2$. The specific value of the preset value can be set according to the actual working conditions. For example, the preset value can be set by taking into consideration temperature values and deformation amount of the lithium battery in different stages of thermal runaway, and the process of the battery thermal runaway will not be described here.

For example, the first preset temperature (T1) can be set to −10° C., and the second preset temperature (T2) can be set according to a decomposition temperature of an SEI (Solid Electrolyte Interface) film of the battery. For example, the second preset temperature (T2) is set to a temperature value which is 10° C. lower than the decomposition temperature of the SEI film, such as 70° C. As a result, the failure of the battery module is detected and the switch is opened before a decomposition of the SEI film. The third preset temperature (T3) can be set according to a fusing temperature of a diaphragm. If a fusing of the diaphragm occurs, positive and negative electrodes of the battery module will be short-circuited, which leads to a violent exothermic reaction. For example, the third preset temperature (T3) can be set to a temperature value which is 15° C. lower than the fusing temperature of the diaphragm, such as 120° C. As a result, the failure of the battery module is detected and the fire extinguishing apparatus is activated before the diaphragm is fused.

The first preset deformation amount ($Z_1$) and the second preset deformation amount ($Z_2$) can be set according to a trigger height of a safety valve. For example, the first preset deformation amount ($Z_1$) is set to a value corresponding to ⅕ of the trigger height of the safety valve, such as 2 mm. The second preset deformation amount ($Z_2$) is set to a value corresponding to ½ of the trigger height of the safety valve, such as 5 mm.

It should be noted that there is no order requirement between steps S102a to S106a in the embodiment shown in FIG. 7a.

Figure 7B:
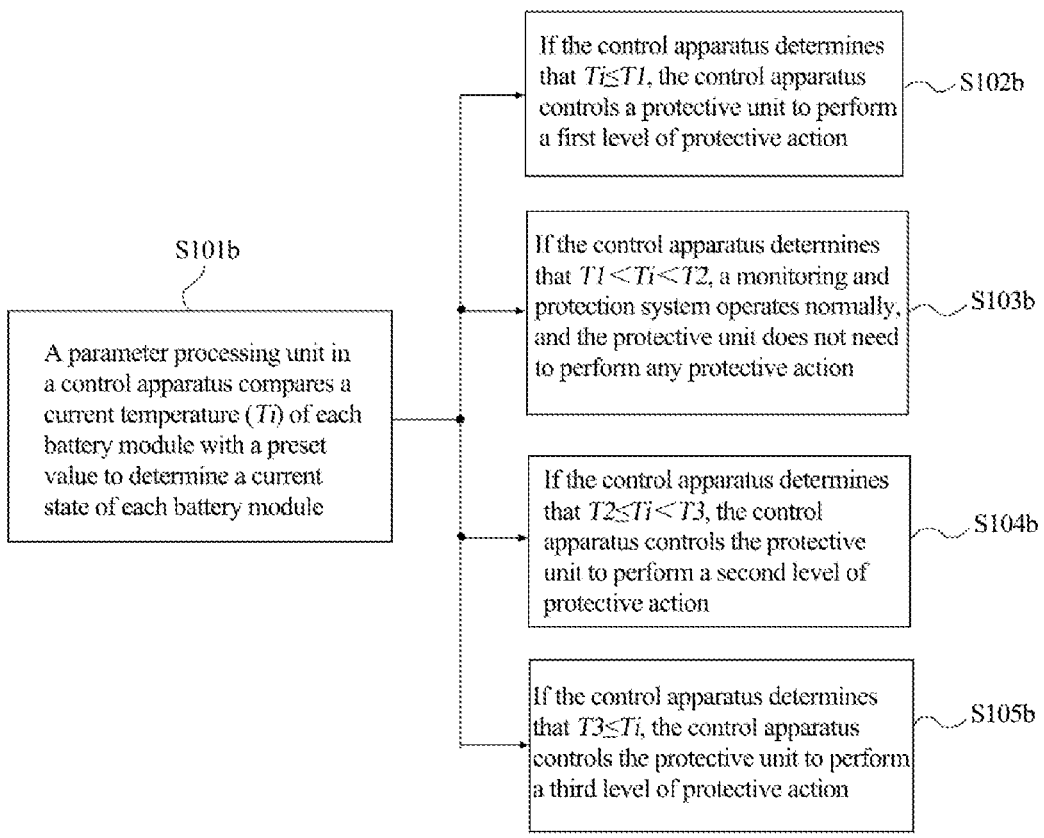
FIG. 7b is a schematic diagram of another control method of a control apparatus according to an embodiment of the present application.

FIG. 7b is a schematic diagram of another control method of a control apparatus provided by an embodiment of the present application. As shown in FIG. 7b, the control method provided by this embodiment mainly performs a corresponding protective action according to a current temperature of a battery module. The control method of this embodiment is generally applicable to the situation where the battery module is not prone to deformation, as most battery modules will undergo significant deformation only after severe impact or long-term operation. The control method of this embodiment can simplify the determination process, and the control method specifically includes the following steps.

S101b, a parameter processing unit in the control apparatus respectively compares a current temperature (Ti) of each battery module with a preset value to determine a current state of each battery module.

S102b, if the control apparatus determines that the current temperature (Ti) is less than or equal to a first preset temperature (T1), the control apparatus controls a protective unit to perform the first level of protective action, which is heating the corresponding battery module.

S103b, if the control apparatus determines that the current temperature (Ti) is greater than the first preset temperature (T1) but less than a second preset temperature (T2), the monitoring and protection system operates normally, and the protective unit does not need to perform any protective action.

S104b, if the control apparatus determines that the current temperature (Ti) is greater than or equal to the second preset temperature (T2) but less than a third preset temperature (T3), the control apparatus controls the protective unit to perform the second level of protective action, which is giving an alarm and opening a switch.

S105b, if the control apparatus determines that the current temperature ($T_i$) is greater than or equal to the third preset temperature ($T_3$), the control apparatus controls the protective unit to perform the third level of protective action, which is activating a fire extinguishing apparatus.

The setting of the first preset temperature ($T_1$), the second preset temperature ($T_2$), and the third preset temperature ($T_3$) are similar to those of the foregoing embodiment, and will not be repeated here.

Figure 7C:
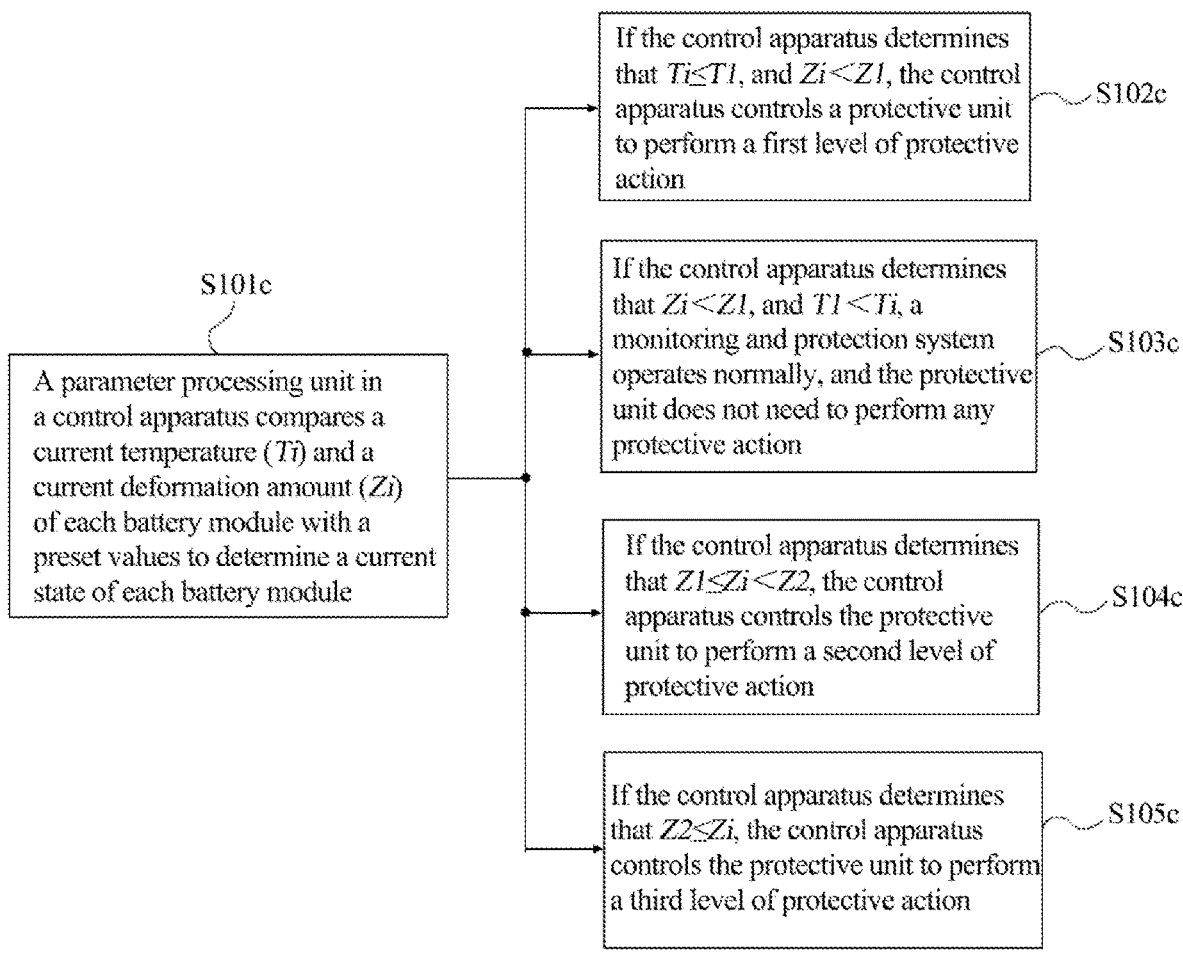
FIG. 7c is a schematic diagram of still another control method of a control apparatus according to an embodiment of the present application.

FIG. 7c is a schematic diagram of still another control method of a control apparatus provided by an embodiment of the present application. As shown in FIG. 7c, the control method provided in this embodiment mainly performs a corresponding protective action according to a current deformation amount of a battery module. The control method of this embodiment is generally applicable to a situation where the battery module is prone to deformation but not prone to thermal runaway. The control method of this embodiment can simplify the determination process, and the control method specifically includes the following step.

S101c, a parameter processing unit in the control apparatus respectively compares a current temperature (Ti) and a current deformation amount (Zi) of each battery module with a preset values to determine a current state of each battery module.

S102c, if the control apparatus determines that the current temperature ($T_i$) is less than or equal to a first preset temperature ($T_1$), and the current deformation amount ($Z_i$) is less than a first preset deformation amount ($Z_1$), the control apparatus controls a protective unit to perform the first level of protective action, which is heating the corresponding battery module.

S103c, if the control apparatus determines that the current deformation amount ($Z_i$) is less than the first preset deformation amount ($Z_1$), and the current temperature ($T_i$) is greater than the first preset temperature ($T_1$), the monitoring and protection system operates normally, and the protective unit does not need to perform any protective action.

S104c, if the control apparatus determines that the current deformation amount ($Z_i$) is greater than or equal to the first preset deformation amount ($Z_1$) but less than a second preset deformation ($Z_2$), the control apparatus controls the protective unit to perform the second level of protective action, which is giving an alarm and opening a switch.

S105c, if the control apparatus determines that the current deformation amount ($Z_i$) is greater than or equal to a second preset deformation amount ($Z_2$), the control apparatus controls the protective unit to perform the third level of protective action, which is activating the fire extinguishing apparatus.

The setting methods of the first preset temperature ($T_1$), the first preset deformation amount ($Z_1$) and the second preset deformation amount ($Z_2$) are similar to those of the above mentioned embodiment, and will not be repeated here.

In the monitoring and protection system according to the embodiment of the present application, the parameter processing unit of the control apparatus respectively compares the received current temperature and/or current deformation amount of each battery module with the preset value to determine the current state of each battery module. The protective unit in the control apparatus performs the corresponding level of protective action in response to the current state of each battery module. Monitor the current temperature and/or the current deformation amount of each battery module in real time, and enable a corresponding protective action based on the monitoring situation, which effectively suppresses and prevents an occurrence of a failure of the battery module, and enhances a safety of the battery module. In addition, the implementation of the monitoring and protection system is simple and easy, has a high realizability and feasibility, so the monitoring and protection system can be widely used to ensure the high safety performance of the battery module.

Figure 8:
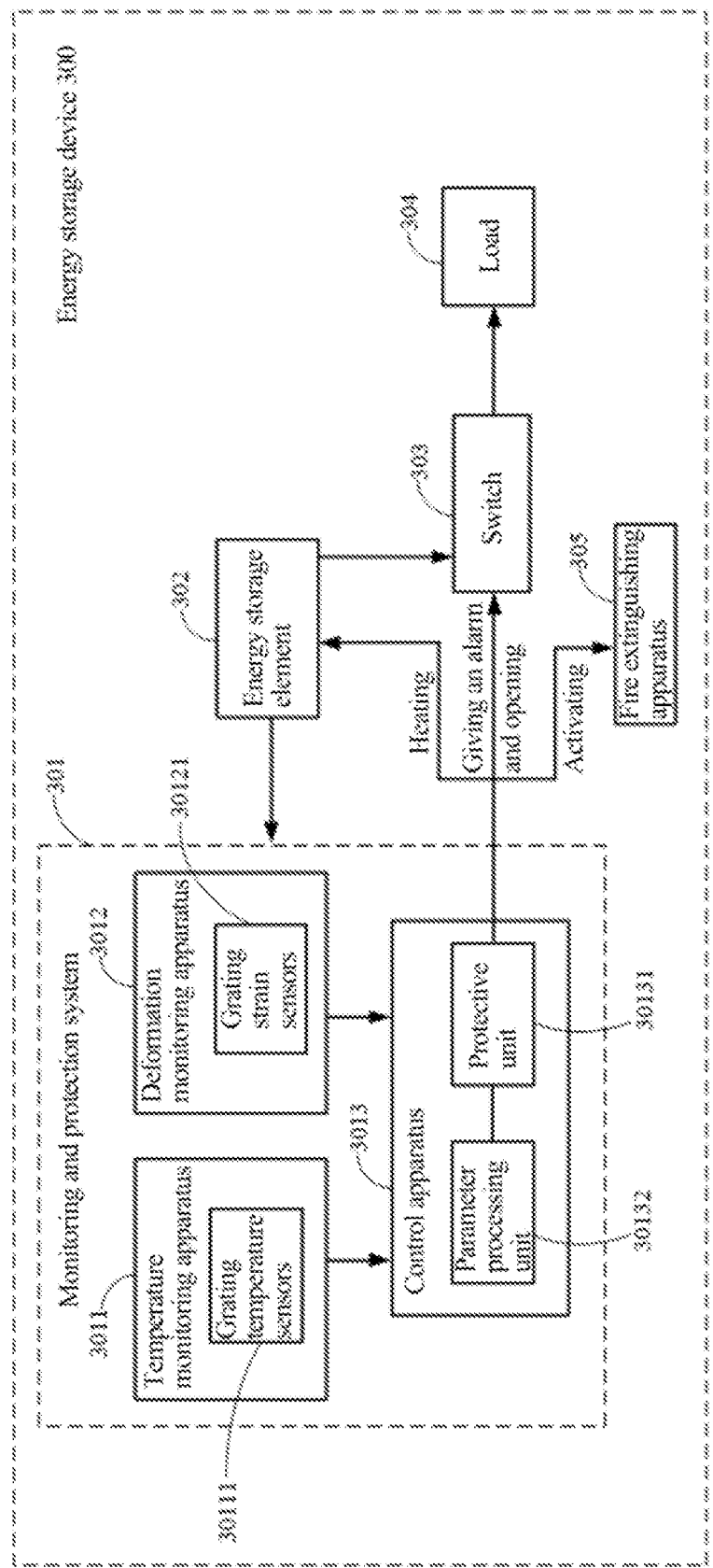
FIG. 8 is a schematic structural diagram of an energy storage device according to an embodiment of the present application.

FIG. 8 is a schematic structural diagram of an energy storage device according to an embodiment of the present application. As shown in FIG. 8, the energy storage device 300 includes a monitoring and protection system 301, at least one energy storage element 302, a switch 303 and a load 304. The switch 303 is coupled between the at least one energy storage element 302 and the load 304, and the monitoring and protection system 301 is coupled to the at least one energy storage element 302 and the switch 303.

Figure 9:
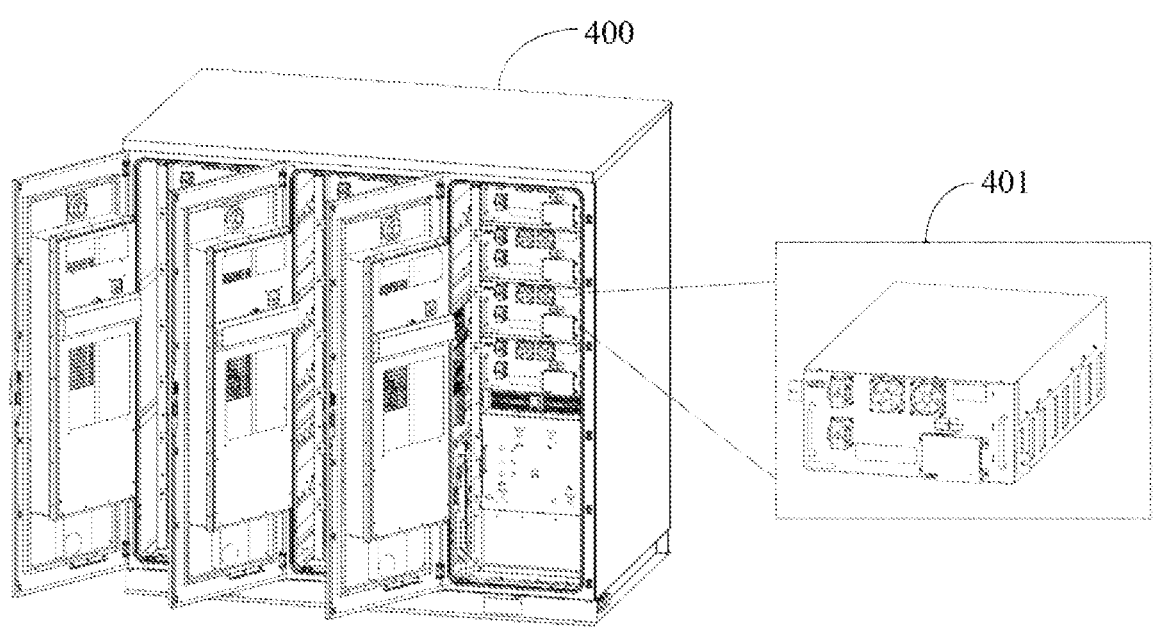
FIG. 9 is a schematic diagram of an energy storage cabinet according to an embodiment of the present application.

It is understandable that the energy storage device 300 may be an energy storage cabinet 400 as shown in FIG. 9. FIG. 9 is a schematic diagram of an energy storage cabinet provided by an embodiment of the present application. Specifically, the monitoring and protection system 301, the at least one energy storage element 302 and the switch 303 are disposed in the energy storage cabinet 400, and the load 304 is electrically connected to the energy storage cabinet 400. The energy storage element 302 may be, for example, the battery module 401 shown in FIG. 9. The energy storage cabinet 400 contains a plurality of energy storage elements such as the battery modules 401. It should be noted that structures other than the battery module 401 are not shown in FIG. 9.

The monitoring and protection system 301 includes a temperature monitoring apparatus 3011, a deformation monitoring apparatus, and a control apparatus 3013. The temperature monitoring apparatus 3011 includes a plurality of grating temperature sensors 30111, and each grating temperature sensor is arranged on a corresponding energy storage element 302 and configured to obtain a current temperature of the corresponding energy storage element 302 through each grating temperature sensor. The deformation monitoring apparatus 3012 includes a plurality of grating strain sensors 30121, and each grating strain sensor is arranged on a corresponding energy storage element 302 and configured to obtain a current deformation amount of the corresponding energy storage element 302 through each grating strain sensor. The control apparatus 3013 is coupled to the temperature monitoring apparatus 3011 and the deformation monitoring apparatus 3012, and configured to receive the current temperature and the current deformation amount of each energy storage element 302 and control a protective unit 30131 to perform a corresponding protective action according to the received signal.

The structure and implementation of the monitoring and protection system 301 in the energy storage device 300 provided in this embodiment are similar to those of the monitoring and protection system 200 in the embodiment shown in FIG. 2.

In some embodiments, the grating temperature sensor 30111 is arranged at any position of the corresponding energy storage element 302. The grating strain sensor 30121 is arranged on an outer surface of the corresponding energy storage element 302, and is located on an axis of the outer surface.

In some embodiments, the temperature monitoring apparatus 3011 further includes a plurality of first optical fibers and a first modem.

Each grating temperature sensor 30111 is coupled to a corresponding first optical fiber, so a first optical signal emitted from the grating temperature sensor 30111 is transmitted to the first modem through the corresponding first optical fiber. The first modem converts the first optical signal into the current temperature of the corresponding energy storage element 302, and transmits the current temperature of each energy storage element to the control apparatus 3013 through a first communication bus.

The structure, implementation, and technical effects of the temperature monitoring apparatus 3011 provided in this embodiment are similar to those of the temperature monitoring apparatus 201 in the embodiment shown in FIG. 4, and will not be repeated here.

In some embodiments, the deformation monitoring apparatus 3012 further includes a plurality of second optical fibers, a second modem and a deformation calculation unit. Each grating strain sensor 30121 is coupled to a corresponding second optical fiber, so a second optical signal emitted from the grating strain sensor 30121 is transmitted to the second modem through the corresponding second optical fiber. The second modem converts the second optical signal into a current strain amount of the corresponding energy storage element 302, and transmits the current strain amount of each energy storage element to the deformation calculation unit through a second communication bus. The deformation calculation unit determines the current deformation amount of each energy storage element according to the current strain amount of each energy storage element and a stored parameter, and transmits the current deformation amount of each energy storage element to the control apparatus 3013 through a third communication bus.

The structure, implementation, and technical effects of the deformation monitoring apparatus 3012 provided in this embodiment are similar to those of the deformation monitoring apparatus 202 in the embodiment shown in FIG. 5, and will not be repeated here.

The deformation calculation unit determines the current deformation amount of each energy storage element 302 according to formula (7), which is as follows:

$$Z_1 = \frac{y_1 \tan\left(\arccos\frac{1}{1+\varepsilon_1}\right)}{2} \quad (7)$$

wherein $Z_1$ is the current deformation amount of each energy storage element 302, $y_1$ is the stored parameter, and $\varepsilon_1$ is the current strain amount of each energy storage element 302. For example, $y_1$ may be a width of a plane of the energy storage element 302 on which the grating strain sensor 30121 arranged.

The principle and technical effect of the process of determining the current deformation amount of each energy storage element 302 by the deformation calculation unit provided in this embodiment are similar to those by the deformation calculation unit 2024 in the embodiment shown in FIG. 6. The determination method of formula (7) is similar to the determination method of formula (1), and the specific process can refer to the foregoing corresponding embodiments, which will not be repeated here.

The control apparatus 3013 includes a parameter processing unit 30132 and a protective unit 30131. The parameter processing unit 30132 is configured to respectively compare the current temperature and the current deformation amount of each energy storage element 302 with a preset value to determine a current state of each energy storage element. The protective unit 30131 is configured to perform a corresponding level of protection in response to the current state of each energy storage element 302.

The protective unit 30131 can perform three levels of protective actions. The first level of protective action corresponds to heating the energy storage element 302, the second level of protective action corresponds to giving an alarm and opening a switch 303 which is used to control opening and closing of electrical connection between the energy storage element 302 and the load 304, and the third level protective action corresponds to activating the fire extinguishing apparatus 305.

The parameter processing unit 30132 in the control apparatus 3013 respectively compares the current temperature and/or the current deformation amount of each energy storage element 302 with the preset value to determine the current state of each energy storage element 302, and the protective unit 30131 in the control apparatus 3013 performs the corresponding level of protection in response to the current state of each energy storage element 302.

For example, if the control apparatus 3013 determines that the current temperature is less than or equal to a first preset temperature, and the current deformation amount is less than a first preset deformation, the protective unit 30131 performs the first level of protective action, which is heating the corresponding energy storage element 302.

If the control apparatus 3013 determines that the current temperature is greater than the first preset temperature but less than a second preset temperature, and the current deformation amount is less than the first preset deformation amount, the protective unit 30131 does not need to perform any protective action.

If the control apparatus 3013 determines that the current temperature is greater than or equal to the second preset temperature but less than a third preset temperature, and the current deformation amount is less than a second preset deformation amount, the protective unit 30131 performs the second level of protective action, which is giving an alarm and opening the switch 303.

If the control apparatus 3013 determines that the current deformation amount is greater than or equal to the first preset deformation amount but less than the second preset deformation amount, and the current temperature is less than the third preset temperature, the protective unit 30131 performs the second level of protective action, which is giving an alarm and opening the switch 303.

If the control apparatus 3013 determines that the current temperature is greater than or equal to the third preset temperature, or the current deformation amount is greater than or equal to the second preset deformation amount, the protective unit 30131 performs the third level of protective action, which is activating the fire extinguishing apparatus 305.

The preset value includes a first preset temperature (T'1), a second preset temperature (T'2), a third preset temperature (T'3), a first preset deformation amount (Z'1) and a second preset deformation amount (Z'2).

The determined current state of each energy storage element can be understood as a relationship the current temperature and/or the current deformation amount with the preset value.

The specific rules of setting a respective value for the first preset temperature (T'1), the second preset temperature (T'2), the third preset temperature (T'3), the first preset deformation amount (Z'1) and the second deformation amount may be similar to those for the first preset temperature (T1), the second preset temperature (T2), the third preset temperature (T3), and the first preset deformation amount (Z1) and the second preset deformation amount (Z2), and will not be repeated here.

In the monitoring and protection system 301 provided in this embodiment, the implementation, principle and technical effects of the parameter processing unit 30132 in the control apparatus 3013 determining the current state of each energy storage element 302 according to the current temperature value and/or current deformation amount of each energy storage element 302, and enabling the protective unit 30131 to perform a corresponding level of protection in response to the current state of each energy storage element are similar to those of the embodiments shown in FIGS. 7a-7c, which will not be repeated here.

The energy storage device provided by the embodiment of the present application includes a monitoring and protection system, at least one energy storage element, a switch, and a load. The monitoring and protection system is coupled to at least one energy storage element and the switch, and includes a temperature monitoring apparatus, a deformation monitoring apparatus, and a control apparatus. A current temperature value and/or a current deformation amount of each energy storage element is monitored in real time, and a corresponding protective action is activated according to the monitoring situation. As a result, an occurrence of a failure of the energy storage element is effectively suppressed and prevented, thereby enhancing a safety of the energy storage element and the energy storage device.

Moreover, the implementation of the monitoring and protection system in the energy storage device is simple and easy, and has a high realizability and feasibility, so it can be widely used to ensure the high safety performance of the energy storage element.

The present application detects temperature and strain amount of a battery module using an optical fiber sensor, calculates a deformation degree of the battery module through the strain amount, determines a failure condition of a battery system, and triggers a protective action accordingly. The monitoring and protection system of the present application is capable of detecting the over-temperature of the battery and deformation or damage of a housing timely with a simple method in a cost efficient and convenient way. The present application is capable of monitoring the temperature and deformation of a battery module, especially a battery in a large-scale energy storage system in real time, which effectively enhances the safety of the battery module. The number of sensors can be increased or decreased according to a dimension of the battery, which thereby has a strong practicality.

After considering the specification and practicing the application disclosed herein, those skilled in the art will easily conceive of other embodiments of the present application. The present application is intended to cover any variations, usages, or adaptive changes of the present application. These variations, usages, or adaptive changes follow the general principles of the present application and include common knowledge or customary technical means in the technical field that are not disclosed in the present application. The description and the embodiments are only regarded as exemplary, and the true scope and spirit of the present application are pointed out by the claims.

It should be understood that the present application is not limited to the precise structure described above or shown in the drawings, and various modifications and changes can be made without departing from its scope. The scope of the present application is only limited by the appended claims.

What is claimed is:

1. A monitoring and protection system, applied to at least one battery module and comprising:
   a temperature monitoring apparatus, comprising a plurality of grating temperature sensors, wherein each grating temperature sensor is arranged on a corresponding battery module, and configured to obtain a temperature of the corresponding battery module;
   a deformation monitoring apparatus, configured to obtain a deformation amount of each battery module, and comprising a plurality of grating strain sensors, wherein each grating strain sensor is arranged on a corresponding battery module; and
   a control apparatus, coupled to the temperature monitoring apparatus and the deformation monitoring apparatus, and configured to receive the temperature and the deformation amount of each battery module and control a protective unit to perform a corresponding protective action according to the temperature and the deformation amount of each battery module; wherein,
   the protective unit is capable of performing three levels of protective actions, wherein a first level of protective action corresponds to heating the battery module, a second level of protective action corresponds to giving an alarm and opening a switch, and a third level of protective action corresponds to activating a fire extinguishing apparatus; and
   wherein the control apparatus comprises a parameter processing unit and the protective unit, the parameter processing unit is configured to compare the temperature with a preset temperature to obtain a first comparison result, and compare the deformation amount with a preset deformation amount to obtain a second comparison result, and determine to perform at least one of the three levels of protective actions or not to perform any protective action according to the first comparison result and the second comparison result.

2. The monitoring and protection system according to claim 1, wherein the grating temperature sensor is arranged at any position of the corresponding battery module; and
the grating strain sensor is arranged on an outer surface of the corresponding battery module, and located at an axis of the outer surface.

3. The monitoring and protection system according to claim 1, wherein the temperature monitoring apparatus further comprises a plurality of first optical fibers and a first modem;
wherein each grating temperature sensor is coupled to a corresponding first optical fiber, and a first optical signal emitted from the grating temperature sensor is transmitted to the first modem through the corresponding first optical fiber; and
the first modem is configured to convert the first optical signal into the temperature of the corresponding battery module, and transmit the temperature of each battery module to the control apparatus.

4. The monitoring and protection system according to claim 1, wherein the deformation monitoring apparatus further comprises a plurality of second optical fibers, a second modem, and a deformation calculation unit;
wherein each grating strain sensor is coupled to a corresponding second optical fiber, and a second optical signal emitted from the grating strain sensor is transmitted to the second modem through the corresponding second optical fiber;
the second modem is configured to convert the second optical signal into a strain amount of the corresponding battery module, and transmit the strain amount of each battery module to the deformation calculation unit; and
the deformation calculation unit is configured to determine the deformation amount of each battery module according to the strain amount of each battery module and a stored parameter, and transmit the deformation amount of each battery module to the control apparatus.

5. The monitoring and protection system according to claim 4, wherein the deformation calculation unit is configured to determine the deformation amount of each battery module according to the following formula:

$$Z = \frac{y \tan\left(\arccos\frac{1}{1+\varepsilon}\right)}{2},$$

wherein Z is the deformation amount of each battery module, y is the stored parameter, and $\varepsilon$ is the strain amount of each battery module.

6. The monitoring and protection system according to claim 1, wherein if the control apparatus determines that the temperature is less than or equal to a first preset temperature and the deformation amount is less than a first preset deformation amount, the protective unit performs the first level of protective action;
if the control apparatus determines that the temperature is greater than or equal to a second preset temperature but less than a third preset temperature, and the deformation amount is less than a second preset deformation amount, the protective unit performs the second level of protective action;
if the control apparatus determines that the deformation amount is greater than or equal to a first preset deformation amount but less than a second preset deformation amount, and the temperature is less than a third preset temperature, the protective unit performs the second level of protective action; or
if the control apparatus determines that the temperature is greater than or equal to a third preset temperature, or the deformation amount is greater than or equal to a second preset deformation amount, the protective unit performs the third level of protective action.

7. An energy storage device, comprising a monitoring and protection system, at least one energy storage element, a switch, and a load, wherein the switch is coupled between the at least one energy storage element and the load, the monitoring and protection system is coupled to the at least one energy storage element and the switch, and the monitoring and protection system comprises:
a temperature monitoring apparatus, comprising a plurality of grating temperature sensors, wherein each grating temperature sensor is arranged on a corresponding energy storage element, and configured to obtain a temperature of the corresponding energy storage element;
a deformation monitoring apparatus, configured to obtain a deformation amount of each energy storage element, and comprising a plurality of grating strain sensors, wherein each grating strain sensor is arranged on a corresponding energy storage element; and
a control apparatus, coupled to the temperature monitoring apparatus and the deformation monitoring apparatus, and configured to receive the temperature and the deformation amount of each energy storage element, and control a protective unit to perform a corresponding protective action according to the temperature and the deformation amount of each energy storage element; where,
the protective unit is capable of performing three levels of protective actions, wherein a first level of protective action corresponds to heating the battery module, a second level of protective action corresponds to giving an alarm and opening a switch, and a third level of protective action corresponds to activating a fire extinguishing apparatus; and
wherein the control apparatus comprises a parameter processing unit and the protective unit, the parameter processing unit is configured to compare the temperature with a preset temperature to obtain a first comparison result, and compare the deformation amount with a preset deformation amount to obtain a second comparison result, and determine to perform at least one of the three levels of protective actions or not to perform any protective action according to the first comparison result and the second comparison result.

8. The energy storage device according to claim 7, wherein the grating temperature sensor is arranged at any position of the corresponding energy storage element; and
the grating strain sensor is arranged on an outer surface of the corresponding energy storage element, and located at an axis of the outer surface.

9. The energy storage device according to claim 7, wherein the temperature monitoring apparatus further comprises a plurality of first optical fibers and a first modem;

wherein each grating temperature sensor is coupled to a corresponding first optical fiber, and a first optical signal emitted from the grating temperature sensor is transmitted to the first modem through the corresponding first optical fiber; and the first modem is configured to convert the first optical signal into the temperature of the corresponding energy storage element, and transmit the temperature of each energy storage element to the control apparatus.

10. The energy storage device according to claim 7, wherein the deformation monitoring apparatus further comprises a plurality of second optical fibers, a second modem and a deformation calculation unit;

wherein each grating strain sensor is coupled to a corresponding second optical fiber, and a second optical signal emitted from the grating strain sensor is transmitted to the second modem through the corresponding second optical fiber;

the second modem is configured to convert the second optical signal into a strain amount of the corresponding energy storage element, and transmit the strain amount of each energy storage element to the deformation calculation unit; and the deformation calculation unit is configured to determine the deformation amount of each energy storage element according to the strain amount of each energy storage element and a stored parameter, and transmit the deformation amount of each energy storage element to the control apparatus.

11. The energy storage device according to claim 10, wherein the deformation calculation unit is configured to determine the deformation amount of each energy storage element according to the following formula:

$$Z_1 = \frac{y_1 \tan\left(\arccos\frac{1}{1+\varepsilon_1}\right)}{2},$$

wherein $Z_1$ is the deformation amount of each energy storage element, $y_1$ is the stored parameter, and $\varepsilon_1$ is the strain amount of each energy storage element.

12. The energy storage device according to claim 7, wherein if the control apparatus determines that the temperature is less than or equal to a first preset temperature and the deformation amount is less than a first preset deformation amount, the protective unit performs the first level of protective action;

if the control apparatus determines that the temperature is greater than or equal to a second preset temperature but less than a third preset temperature, and the deformation amount is less than a second preset deformation amount, the protective unit performs the second level of protective action;

if the control apparatus determines that the deformation amount is greater than or equal to a first preset deformation amount but less than a second preset deformation amount, and the temperature is less than a third preset temperature, the protective unit performs the second level of protective action; or if the control apparatus determines that the temperature is greater than or equal to a third preset temperature, or the deformation amount is greater than or equal to a second preset deformation amount, the protective unit performs the third level of protective action.

\* \* \* \* \*